United States Patent
Sakairi et al.

(10) Patent No.: US 9,933,267 B2
(45) Date of Patent: Apr. 3, 2018

(54) NAVIGATION DEVICE AND NAVIGATION METHOD

(71) Applicant: MITSUBISHI ELECTRIC CORPORATION, Chiyoda-ku (JP)

(72) Inventors: Takeo Sakairi, Tokyo (JP); Yukio Goto, Tokyo (JP); Tomoya Ikeuchi, Tokyo (JP); Makoto Mikuriya, Tokyo (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 158 days.

(21) Appl. No.: 14/894,014

(22) PCT Filed: Sep. 17, 2013

(86) PCT No.: PCT/JP2013/005465
§ 371 (c)(1),
(2) Date: Nov. 25, 2015

(87) PCT Pub. No.: WO2014/192047
PCT Pub. Date: Dec. 4, 2014

(65) Prior Publication Data
US 2016/0109244 A1    Apr. 21, 2016

(30) Foreign Application Priority Data

May 27, 2013 (JP) .................. 2013-111094

(51) Int. Cl.
*G08G 1/123* (2006.01)
*G01C 21/26* (2006.01)
(Continued)

(52) U.S. Cl.
CPC ............ *G01C 21/26* (2013.01); *G01C 21/32* (2013.01); *G06F 17/30241* (2013.01);
(Continued)

(58) Field of Classification Search
CPC combination set(s) only.
See application file for complete search history.

(56) References Cited

U.S. PATENT DOCUMENTS 8,396,660 B2 *  3/2013  Takahata ............... G01C 21/32
                                                       701/450
9,002,545 B2 *  4/2015  Wilson ................ B61L 15/0072
                                                        701/19
(Continued)

FOREIGN PATENT DOCUMENTS

CN          101275839 A      10/2006
CN          101246016 A      8/2008
(Continued)

OTHER PUBLICATIONS

International Preliminary Report on Patentability and Written Opinion dated Dec. 10, 2015 in PCT/JP2013/005465 with English translation.

(Continued)

*Primary Examiner* — Hussein Elchanti
(74) *Attorney, Agent, or Firm* — Oblon, McClelland, Maier & Neustadt, L.L.P.

(57) ABSTRACT

Map data is managed by being divided into a geometric information data list of pieces of geometric information or a phase information data list of pieces of phase information, an attribute information data list of pieces of attribute information, and a relation information data list of pieces of relation information each indicating a relation between the geometric information or the phase information and the attribute information. The pieces of attribute information in the attribute information data list are arranged in the order corresponding to the pieces of geometric information or phase information which are feature information, and the pieces of relation information are arranged in the order (Continued)

corresponding to the pieces of geometric information or phase information which are feature information.

11 Claims, 10 Drawing Sheets

(51) Int. Cl.
*G01C 21/32* (2006.01)
*G06F 17/30* (2006.01)
*G09B 29/00* (2006.01)
*G09B 29/10* (2006.01)

(52) U.S. Cl.
CPC ............ *G09B 29/00* (2013.01); *G09B 29/003* (2013.01); *G09B 29/106* (2013.01)

(56) References Cited

U.S. PATENT DOCUMENTS

| | | | |
|---|---|---|---|
| 9,098,496 B2 | 8/2015 | Matsunaga et al. | |
| 9,142,147 B2 | 9/2015 | Koshiba et al. | |
| 2003/0065432 A1* | 4/2003 | Shuman | B60K 31/0008 |
| | | | 701/48 |
| 2005/0144049 A1* | 6/2005 | Kuzunuki | G01C 21/34 |
| | | | 705/6 |
| 2007/0076920 A1* | 4/2007 | Ofek | G06T 3/4038 |
| | | | 382/113 |
| 2007/0213929 A1* | 9/2007 | Tanizaki | G06F 17/30241 |
| | | | 701/451 |
| 2008/0208451 A1* | 8/2008 | Minami | G01C 21/3484 |
| | | | 701/533 |
| 2010/0004855 A1* | 1/2010 | Liao | G01C 21/32 |
| | | | 701/532 |
| 2010/0042315 A1* | 2/2010 | Ikeuchi | G01C 21/32 |
| | | | 701/532 |
| 2010/0191456 A1* | 7/2010 | Nogawa | G01C 21/32 |
| | | | 701/533 |
| 2011/0172913 A1* | 7/2011 | Nakamura | G01C 21/32 |
| | | | 701/532 |
| 2011/0300848 A1* | 12/2011 | Boudreau | G01C 21/32 |
| | | | 455/419 |
| 2011/0302214 A1* | 12/2011 | Frye | G06F 17/30247 |
| | | | 707/802 |

FOREIGN PATENT DOCUMENTS

| | | |
|---|---|---|
| CN | 101275839 A | 10/2008 |
| JP | 6-274102 A | 9/1994 |
| JP | 2001-92352 A | 4/2001 |
| JP | 2002-123835 A | 4/2002 |
| JP | 2005-265491 A | 9/2005 |
| JP | 2007-101580 A | 4/2007 |
| JP | 4193392 B2 | 12/2008 |
| JP | 2009-9182 A | 1/2009 |
| JP | 2011-158636 A | 8/2011 |
| JP | 2012-173384 A | 9/2012 |
| JP | 2012-207973 A | 10/2012 |

OTHER PUBLICATIONS

International Search Report dated Nov. 26, 2013 in PCT/JP2013/005465 filed Sep. 17, 2013.

Combined Office Action and Search Report dated Jun. 16, 2017 in Chinese Patent Application No. 201380076930.9 (with English language translation of Search Report).

* cited by examiner

| ID | GEOMETRIC TYPE | COORDINATE ARRANGEMENT |
|---|---|---|
| 1 | POINT | (100,100) |
| 2 | POINT | (150,100) |
| ⋮ | ⋮ | ⋮ |
| N | POINT | (200,300) |

70

73

72

| ID | Attr_1 | Attr_2 | ... | Attr_n |
|---|---|---|---|---|
| 1 | 1000 | STRING1 | ... | |
| 2 | 2000 | STRING2 | ... | |
| ... | ... | ... | ... | |
| N | Integer | String | ... | |

| APPLICATION FUNCTION NAME | ATTRIBUTE HOLDING TYPE | ATTRIBUTE DEFINITION INFORMATION TO BE USED |
|---|---|---|
| MAP DISPLAY | 10 | 1,3 |
| ROUTE SEARCH | 10 | 4,5,6 |

FIG. 15
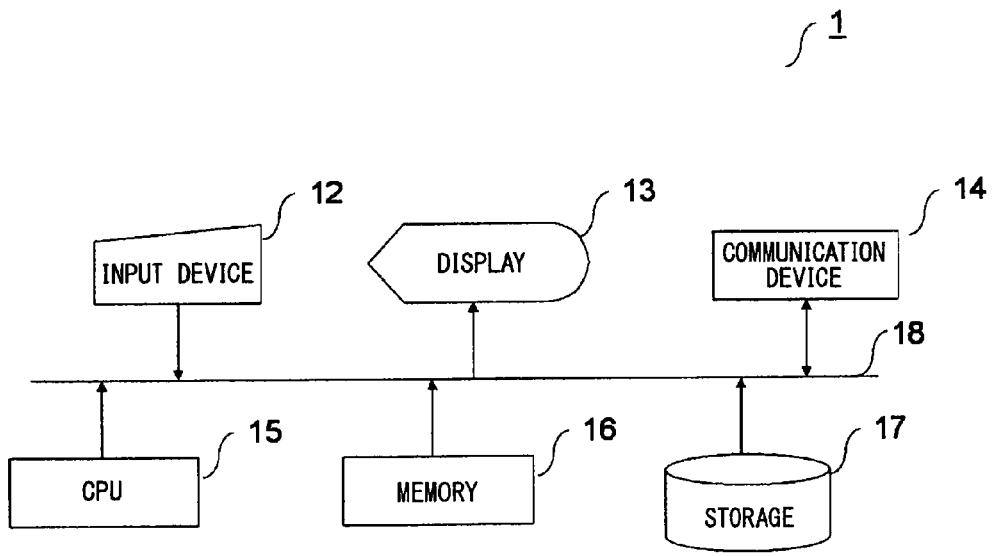
FIG. 16
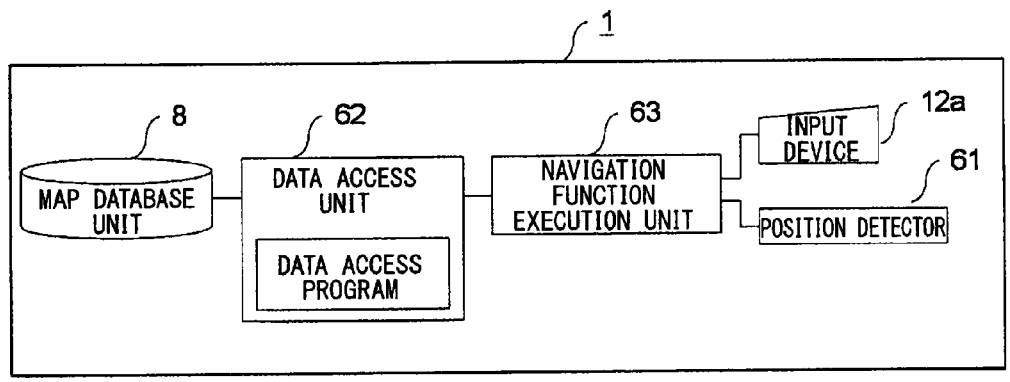
FIG. 17
| ID | Attr1 | Attr2 |
|---|---|---|
| 1 | 1000 | STRING1 |
| 2 | 2000 | STRING2 |
| ... | ... | ... |
| N | Integer | String |
101
| ID | Attr5 | Attr6 | Attr7 | Attr8 |
|---|---|---|---|---|
| 1 | 1000 | 0.5 | 2012/1/1 | STRING1 |
| 2 | 2000 | 0.2 | 2012/5/4 | STRING2 |
| ... | ... | ... | ... | ... |
| N | Integer | Float | Date | String |
102

| ID | Attr_1st (TOP) | Attr_2nd | Attr_3rd | Attr_4th | Attr_5th | DATA SIZE |
|---|---|---|---|---|---|---|
| 1 | 0 | 8 | 24 | 28 | 32 | 62 |
| 2 | 62 | 70 | 86 | 90 | 94 | 68 |
| 3 | 130 | 138 | 154 | 158 | 162 | 64 |
| 4 | 194 | 202 | 218 | 222 | 226 | 60 |
| ... | ... | ... | ... | ... | ... | ... |
| N | offset1 | offset2 | offset3 | offset4 | offset5 | DataSize |

OFFSET FOR EACH ATTRIBUTE — 110

NAVIGATION DEVICE AND NAVIGATION METHOD

TECHNICAL FIELD

The present invention relates to an information terminal device capable of displaying a map and a method of generating map data, by which map data to be stored into the information terminal device is generated.

BACKGROUND ART

In a conventional structure of map data to be used for displaying a map in an information terminal device, information on a component of a map and attribute information representing an attribute of this component are held together. In such a map data structure, it is necessary to associate the data on the component of the map with corresponding attribute data by some means.

Conventionally, when associating information on a component of a map with corresponding attribute information, proposed is a method of generating a data list in which pieces of information on the components are arranged and a data list in which pieces of attribute information are arranged so that the pieces of information on the components and the pieces of corresponding attribute information are arranged in the same order in these data lists (for example, in Patent Document 1).

PRIOR-ART DOCUMENTS

Patent Documents

[Patent Document 1] Japanese Patent Application Laid-Open Gazette No. 2011-158636

SUMMARY OF INVENTION

Problems to be Solved by the Invention

In a conventional method of generating map data, inside information on a component, a flag indicating whether or not the information on the component has attribute information is embedded. For this reason, when an attribute value is added or deleted in the attribute information, the data itself on the component needs to be updated and therefore there is some problem in data extensibility.

The present invention is intended to solve the above problem, and it is an object of the present invention to provide an information terminal device capable of flexibly adding and deleting an attribute value, a method of generating map data to be used therein, and a map data recording medium which records therein the map data.

Means for Solving the Problems

An information terminal device concerning the present invention includes a map database unit to store therein map data having a feature information data list in which pieces of feature information each representing a feature are arranged, an attribute information data list in which pieces of attribute information each of the feature are arranged, and a relation information data list in which pieces of relation information each including attribute holding type information indicating whether or not there is the attribute information corresponding to the feature information are arranged corresponding to the order of the feature information, a navigation function execution unit to execute a navigation function, and a data access unit to acquire map data to be used by the navigation function execution unit, from the map database unit and associate the feature information with corresponding attribute information in the order of arrangement of the relation information when the map data to be used by the navigation function execution unit is acquired from the map database unit, and in the information terminal device, the attribute information data list is arranged corresponding to the order of the feature information and when the attribute information corresponding to the feature information arranged in the feature information data list does not exist, the attribute information data list is arranged with the attribute information omitted, and the relation information associates the feature information with the attribute information when the attribute holding type information indicates that there is the attribute information corresponding to the feature information.

Further, a method of generating map data concerning the present invention includes generating a feature information data list in which pieces of feature information each representing a feature are arranged, generating an attribute information data list in which pieces of attribute information each of the feature are arranged, and generating a relation information data list in which pieces of relation information each including attribute holding type information indicating whether or not there is the attribute information corresponding to the feature information are arranged corresponding to the order of the feature information.

Further, an information terminal device includes a map database to store therein map data having a feature information data list in which pieces of feature information each representing a feature are arranged, an attribute information data list in which pieces of attribute information each of the feature are arranged, and a relation information data list in which pieces of relation information each including attribute holding type information indicating whether or not there is the attribute information corresponding to the feature information are arranged corresponding to the order of the feature information; a processor to execute a program; and a memory to store the program which results in performance of steps including: executing a navigation function; acquiring map data to be used in executing the navigation function from the map database; and associating the feature information with corresponding attribute information in the order of arrangement of the relation information when the map data to be used in executing the navigation function is acquired from the map database, wherein an arrangement of the attribute information data list is made corresponding to the order of the feature information and when the attribute information corresponding to the feature information arranged in the feature information data list does not exist, the arrangement of the attribute information data list is made with the attribute information omitted, and the relation information associates the feature information with the attribute information when the attribute holding type information indicates that there is the attribute information corresponding to the feature information.

Effects of the Invention

According to the information terminal device concerning the present invention, it is possible to increase the data extensibility in adding and deleting the attribute value of the attribute information. Further, since the relation information includes the attribute holding type information, it is possible to improve the efficiency of data access even when it is intended to acquire a plurality of attributes at one time.

Further, according to the method of generating map data concerning the present invention, it is possible to increase the data extensibility in adding and deleting the attribute value of the attribute information. Further, since the relation information includes the attribute holding type information, it is possible to improve the efficiency of data access even when it is intended to acquire a plurality of attributes at one time.

BRIEF DESCRIPTION OF DRAWINGS

FIG. 15 is a block diagram showing a constitution of an information terminal device in accordance with the first preferred embodiment of the present invention;

FIG. 16 is a view further showing a constitution of the information terminal device in accordance with the first preferred embodiment of the present invention;

FIG. 17 is a view showing constitutions to manage attribute information in accordance with a second preferred embodiment of the present invention;

DESCRIPTION OF EMBODIMENT(S)

The First Preferred Embodiment

Figure 1:
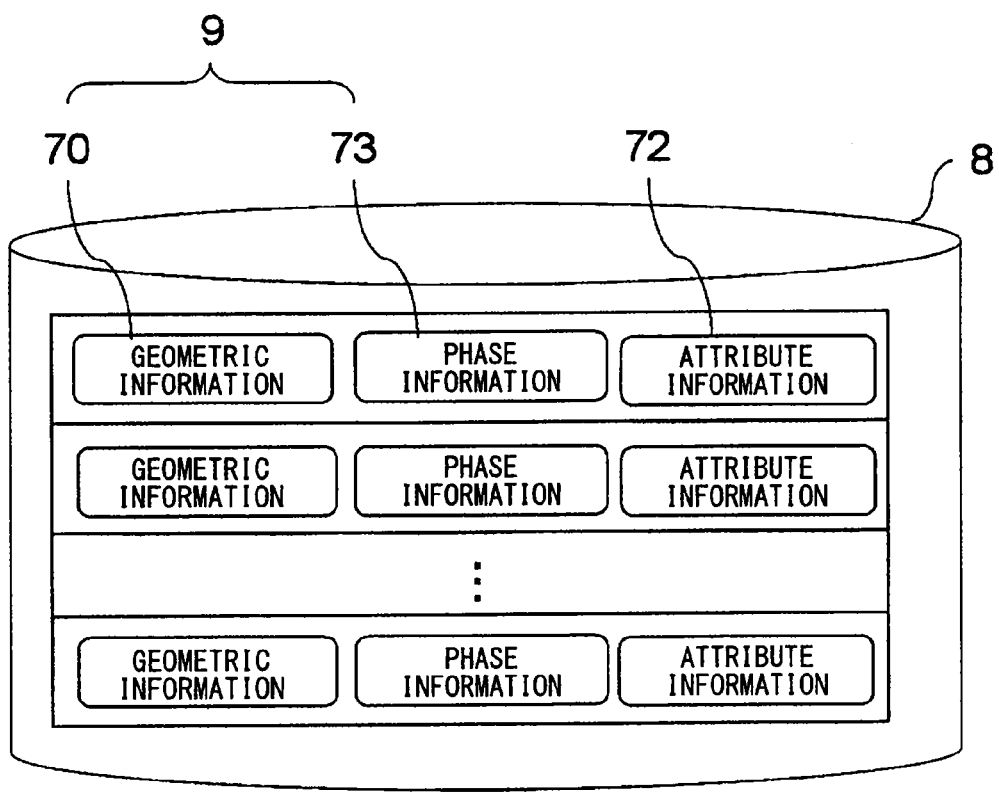
FIG. 1 is a view showing a constitution of a map database.

FIG. 1 schematically shows a constitution of map data in the first preferred embodiment of the present invention. A map database unit 8 included in an information terminal device records therein feature information 9 and attribute information 72 which are information on components of a map. Further, the feature information 9 includes at least one of geometric information 70 indicating coordinates each consisting of the latitude and longitude or the like representing a shape of a feature and phase information 73 indicating connection of features. FIG. 1 shows an exemplary case where the feature information 9 includes both the geometric information 70 and the phase information 73.

In the present specification, a feature is defined as a concept indicating everything existing on and under the ground. For example, a feature refers to any one of a road, a railway (including a subway), a river, a building, an administrative boundary, or the like.

In order to use the map data consisting of the feature information 9 and the attribute information 72 in the information terminal device, it is necessary to associate the geometric information 70, the attribute information 72, and the phase information 73 with one another. For example, when a road network is shown, the phase information 73 is associated with the attribute information 72. Further, when a road shape and a road name or the like related to the road shape are shown, the geometric information 70 is associated with the attribute information 72.

Figure 2:
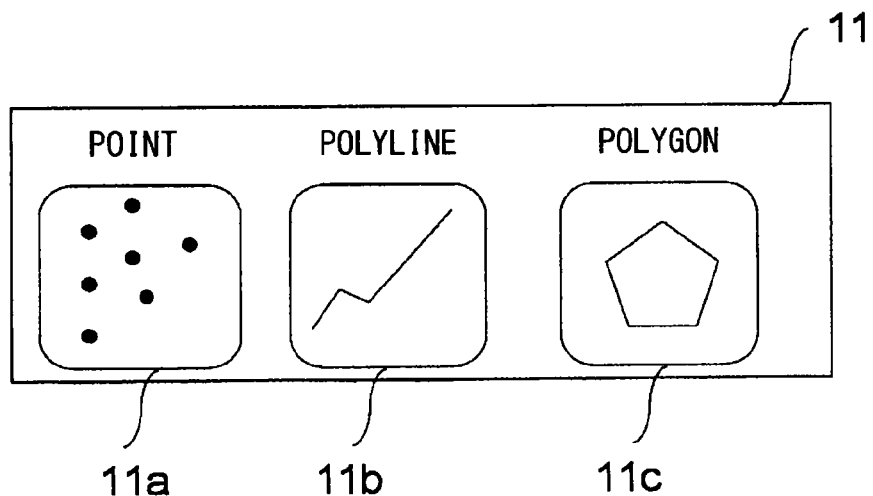
FIG. 2 is a view showing a geometric information type of geometric information.

FIG. 2 shows a geometric information type 11 representing the types of the geometric information 70. As shown in FIG. 2, the geometric information 70 is classified into point (dot) data 11a representing a representative point or the like of a municipality name or a place name, polyline (line) data 11b representing a line such as a river, a bus route, a contour line, or the like, and polygon (plane) data 11c representing a closed space such as a family tree, a park, a lake, or the like.

Further, in a case where the geometric information 70 is information on a road, the attribute information 72 corresponding to the geometric information 70 includes a road type such as a national road, a prefectural road, a municipal road, or the like, a road width, a road name, and the like. By associating the geometric information 70 with the attribute information 72, the road shape and the road name information or the like are specified and these information can be used as a map.

Figures 3, 4, 5:
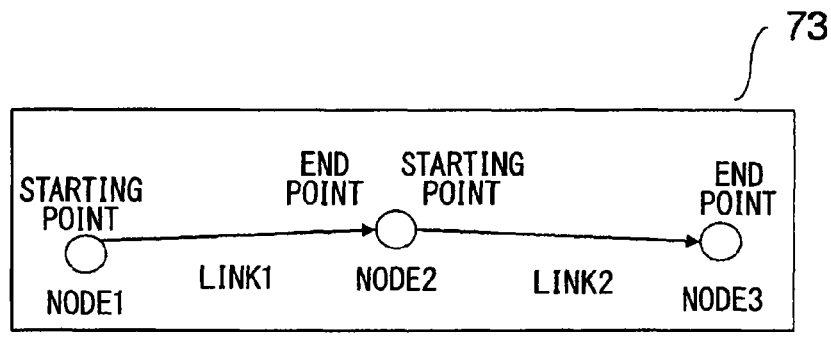
FIG. 3 is a view showing a geometric information list.
FIG. 4 is a view showing a constitution of phase information.
FIG. 5 is a view showing a constitution of attribute information.

FIG. 3 shows an exemplary constitution of the geometric information 70 on a plurality of features. FIG. 3 shows, however, a case where the geometric information type 11 of the geometric information 70 is the point (dot) data 11a. The geometric information 70 sometimes includes a geometric information type ("POINT" in FIG. 3) representing the type of a geometric shape, a feature ID representing an arrangement order (sequence) of the geometric information 70, and the like as well as an arrangement of coordinate points (coordinate arrangement) representing a shape of the geometric information 70.

Further, in FIG. 3, when the geometric information type 11 of the geometric information 70 is the polyline (line) data 11b, the geometric information type 11 is a polyline and the coordinate arrangement includes a plurality of coordinates. Thus, by specifying the geometric information type 11 and the coordinate arrangement, the geometric information 70 becomes information representing a shape of a feature.

For managing the geometric information 70, there are management methods in which the geometric information 70 is encoded or compressed with respect to the arrangement of coordinate values in consideration of security. Such geometric information 70 is stored in a storage device (HDD: Hard Disk Drive) having a magnetic disk or the like.

FIG. 4 is a schematic view used for explanation of the phase information 73 of features. As shown in FIG. 4, the phase information 73 represents connection of features by using nodes and links. The phase information 73 is needed in order to manage network data such as a road network or a railway network. The node refers to a joint point such as an intersection, which is a constituent element of a network, and the link refers to a line segment connecting a node and another node.

FIG. 5 shows an exemplary constitution of the attribute information 72 representing characteristics of a feature. The attribute information 72 includes an ID representing an order of the attribute information and a plurality of types of attribute values (Attr_1, Attr_2, . . . Attr_n) representing characteristics of the feature. The types of attribute values include a numerical value (Integer) representing the width of a road or the like as Attr_1, a character string (String) representing a name of the road or the like as Attr_2, an image (Image), not shown, such as an icon or the like representing a feature, and the like. A list in which pieces of attribute information 72 corresponding to a plurality of pieces of geometric information 70 are arranged is an attribute information data list 41.

Figure 6:
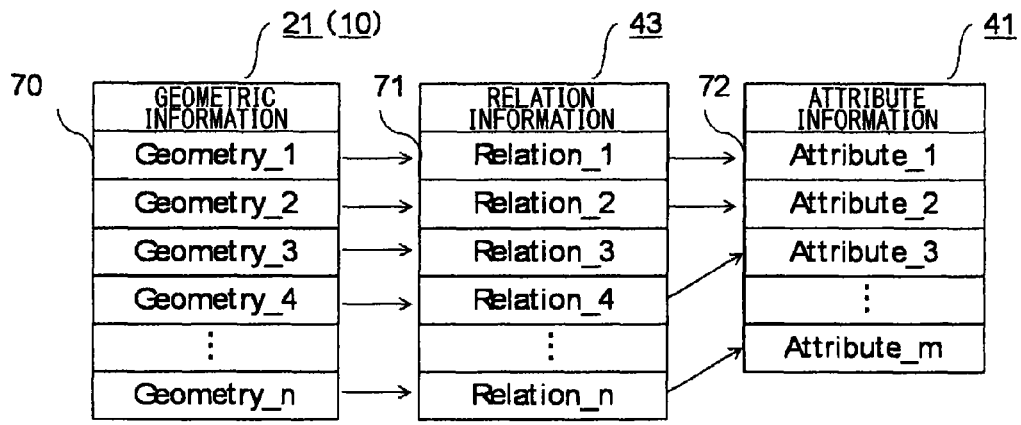
FIG. 6 is a view showing a constitution of map data in accordance with a first preferred embodiment of the present invention.

FIG. 6 shows a constitution of the map data in accordance with the first preferred embodiment of the present invention. The map data of the first preferred embodiment of the present invention consists of a geometric information data list 21 in which the pieces of geometric information 70 are arranged, the attribute information data list 41 in which the pieces of attribute information 72 are arranged, and a relation information data list 43 in which pieces of relation information 71 associating these information are arranged. In other words, new information associating the geometric information 70 with the attribute information 72 is generated, and this achieves efficient association between the geometric information 70 and the attribute information 72.

The relation information 71 is information generated by a map data generator in, for example, a factory or the like, and indicates a relation between a piece of geometric information 70 and the piece of attribute information 72 that the geometric information 70 has. Specifically, since each piece of relation information 71 is generated correspondingly to the piece of geometric information 70, the number of pieces of geometric information 70 in the geometric information data list 21 is equal to the number of pieces of relation information 71 in the relation information data list 43.

Since the geometric information 70 belongs to the feature information 9, the geometric information data list 21 belongs to a feature information data list 10. Further, in the first preferred embodiment, since the feature information 9 also includes the phase information 73, a phase information data list in which the pieces of phase information 73 are arranged is also the feature information data list 10. In other words, the feature information data list 10 includes at least one of the phase information data list and the geometric information data list 21.

Though association between the geometric information 70 and the attribute information 72 will be described in the present preferred embodiment, association between the phase information 73 and the attribute information 72 can be also achieved in the same manner and the description thereof will be omitted.

In other words, even when the phase information data list, as the feature information data list 10, in which the pieces of phase information 73 are arranged is associated with the attribute information data list 41, the association can be achieved by generating such relation information as described below.

Next, description will be made on arrangements of pieces of information constituting the geometric information data list 21, the relation information data list 43, and the attribute information data list 41. In FIG. 6, the order of the arrangement of the pieces of attribute information 72 in the attribute information data list 41 corresponds to that of the pieces of geometric information 70 in the geometric information data list 21.

Further, the order of the arrangement of the pieces of relation information 71 in the relation information data list 43 corresponds to that of the pieces of geometric information 70 in the geometric information data list 21. With such an arrangement, the geometric information 70 can be associated with the relation information 71 without any particular flag. In other words, the order of the arrangement of the pieces of attribute information 72 in the attribute information data list 41 is basically the same as that of the pieces of relation information 71 in the relation information data list 43.

If the geometric information 70 does not have the attribute information 72, the relation information 71 includes information indicating that the geometric information 70 does not have any attribute information 72. This is, for example, a case where there is geometric information 70 on a road but there is no attribute information 72 related to the geometric information 70 or it is uncertain whether or not there is attribute information 72, or the like case. Specifically, this is a case where there is no content in the row corresponding to an ID in the attribute information 72 shown in FIG. 5.

As shown in FIG. 6, in the relation information data list 43, when the third geometric information (Geometry_3) in the geometric information data list 21 does not have any attribute information 72, the third relation information (Relation_3) in the relation information data list 43 includes information indicating that the geometric information (Geometry_3) does not have any corresponding attribute information 72.

Thus, if the geometric information 70 does not have any corresponding attribute information 72, since the attribute information 72 can be omitted and the pieces of attribute information 72 can be arranged closely (without any space for absent attribute information) in the attribute information data list 41, it is possible to reduce the data size of the attribute information data list 41.

Further, since the information indicating whether or not the geometric information 70 has the corresponding attribute information 72 is included in the relation information 71, not in the geometric information 70, even when some change or addition to the attribute information 72 is needed, it is possible to ensure high extensibility without any necessity of changing the geometric information 70 itself.

Figure 7:
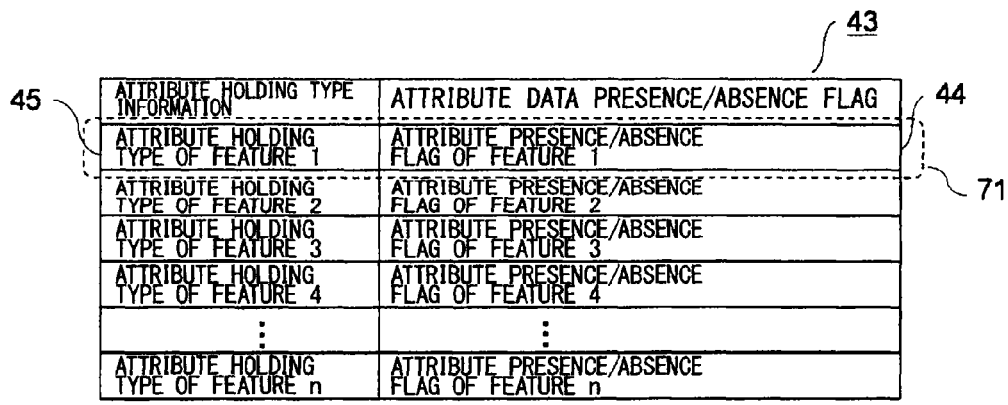
FIG. 7 is a view showing a structure of relation information in accordance with the first preferred embodiment of the present invention.

FIG. 7 shows the relation information 71 in the relation information data list 43 in detail. The relation information 71 includes an attribute data presence/absence flag 44 and attribute holding type information 45. The attribute data presence/absence flag 44 indicates the type of attribute that the geometric information 70 has. On the other hand, the attribute holding type information 45 is information indicating a form of holding an attribute of the geometric information 70.

Figure 8:
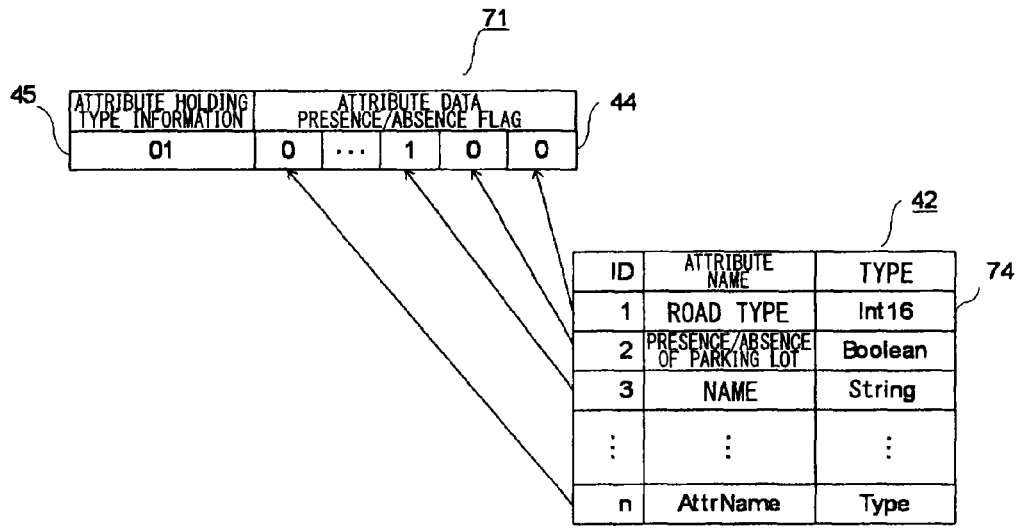
FIG. 8 is a view showing a constitution of the relation information in accordance with the first preferred embodiment of the present invention.

FIG. 8 shows the attribute data presence/absence flag 44 and the attribute holding type information 45 in the relation information 71 in more detail. The attribute data presence/absence flag 44 has an arrangement of 1-bit Bool values (0 or 1), each of which corresponds to the attribute value of each type (the type of attribute). The arrangement of the attribute values is defined in advance by an attribute definition information data list 42 shown in FIG. 8.

In other words, the Bool values are arranged in the attribute data presence/absence flag 44, correspondingly to pieces of attribute definition information 74 in the attribute definition information data list 42. The attribute definition information data list 42 is generated in advance by a maker of the map data, or the like, and inputted into the map data generator when the map data is generated.

The attribute definition information data list 42 consists of the pieces of attribute definition information 74 defining various attribute values and defines an ID, an attribute name, and a type which indicate the arrangement of the attribute definition information 74. The attribute definition information 74 is extracted from the attribute information 72 of the original map data by the map data generator when the original map data is inputted into the map data generator.

As the attribute name of the attribute information 72, a road type, presence/absence of parking lot, a name, "AttrName" that is a given attribute name, or the like is used, and as the type corresponding thereto, "Int16" (a value indicating the road type), Boolean (a Bool value represented by 0 or 1), "String" (a name of the road), or "Type" that is a type corresponding to the given attribute name is arranged.

The attribute definition information data list 42 is stored in the storage device having a magnetic disk or the like by using data definition means such as XML or the like and is used for map display or the like in the information terminal device.

Next, the attribute holding type information 45 will be described. The attribute holding type information 45 is 2-bit data positioned top of the relation information 71. Further, since the attribute holding type information 45 uses 2-bit data, it is possible to express 4-pattern data constitutions.

When the bit value of the attribute holding type information 45 is "00", this indicates that the corresponding geometric information 70 does not have attribute information 72. In this case, the relation information 71 does not have any attribute data presence/absence flag 44 and has only data (2 bits) of the attribute holding type information 45. With such a form, it is possible to reduce the data size of the relation information data list 43.

When the bit value of the attribute holding type information 45 is "01", this indicates that the geometric information 70 corresponding to the relation information 71 has relevant attribute information 72. In this case, as shown in FIG. 8, the attribute data presence/absence flag 44 is arranged after the 2 bits of the attribute holding type information 45. The arrangement of the Bool values constituting the attribute data presence/absence flag 44 corresponds to the order of the pieces of attribute definition information 74 defined in advance by the attribute definition information data list 42. Further, this order may be ascending only if the orders of data are the same.

Specifically, as shown in FIG. 8, 1-bit Bool value indicating whether or not the attribute definition information 74 (AttrName) that is defined as the n-th one in the attribute definition information data list 42 exists is stored in the attribute data presence/absence flag 44 (in the case of FIG. 8, since the attribute data presence/absence flag 44 corresponding to the n-th one is "0", this indicates that there is no data). With such an arrangement, since any flag indicating the attribute definition information 74 to which the Bool value in the attribute data presence/absence flag 44 corresponds is not needed, it is possible to reduce the data size.

When the bit value of the attribute holding type information 45 is "10", this indicates that the geometric information 70 corresponding to the relation information 71 has the attribute information 72 and further has a plurality of groups. The groups refer to various functions to be executed by the information terminal device, i.e., applications. For example, there are a route search function, a map display function, and the like that correspond to the groups.

Figure 9:
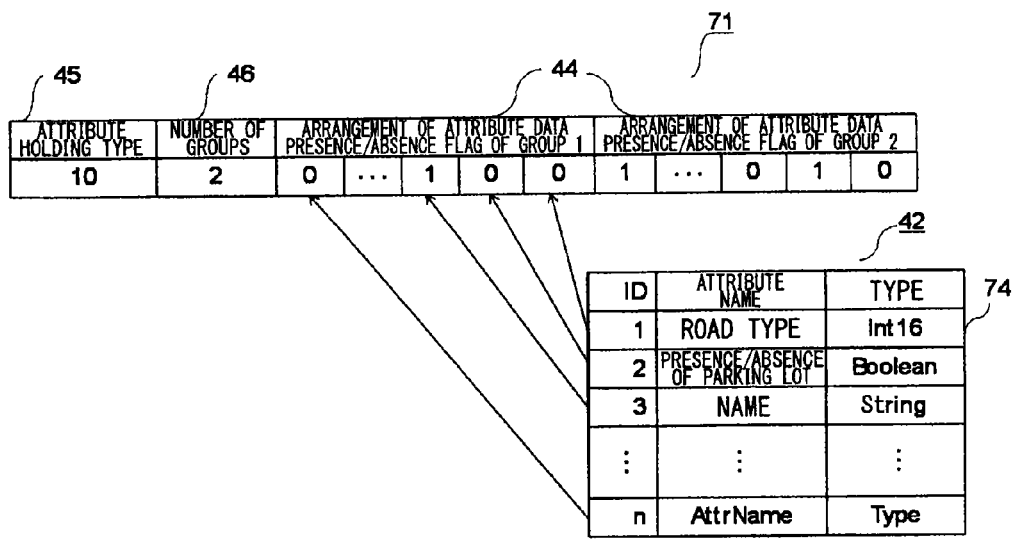
FIG. 9 is a view showing another constitution of the relation information in accordance with the first preferred embodiment of the present invention.

FIG. 9 shows data constitution of the relation information 71 in the case where the bit value of the attribute holding type information 45 is "10". In this case, numerical data 46 indicating the number of groups is arranged between the attribute holding type information 45 and the attribute data presence/absence flag 44. In the present preferred embodiment, the number of groups is "2". The number of groups can be set in advance, for example, when the map data is generated.

As shown in FIG. 9, the arrangement of the Bool values corresponding to the attribute data presence/absence flags 44 in the number of groups is placed after the number of groups 46. The arrangement of the Bool values in the attribute data presence/absence flag 44 for each group has the same order as the arrangement of the pieces of attribute definition information 74 in the attribute definition information data list 42, like in the above-described case where the value of the attribute holding type information 45 is "01".

When the bit value of the attribute holding type information 45 is "11", this indicates that the geometric information 70 corresponding to the relation information 71 has the attribute information 72 and further has a plurality of values with respect to the same attribute definition information 74. As the case where one piece of geometric information 70 has a plurality of pieces of same attribute definition information 74, there is a case where the traffic control is changed by time zones. This is, for example, a case where the right turn is allowed during a time zone and is not allowed during the other time zone at an intersection.

Figure 10:
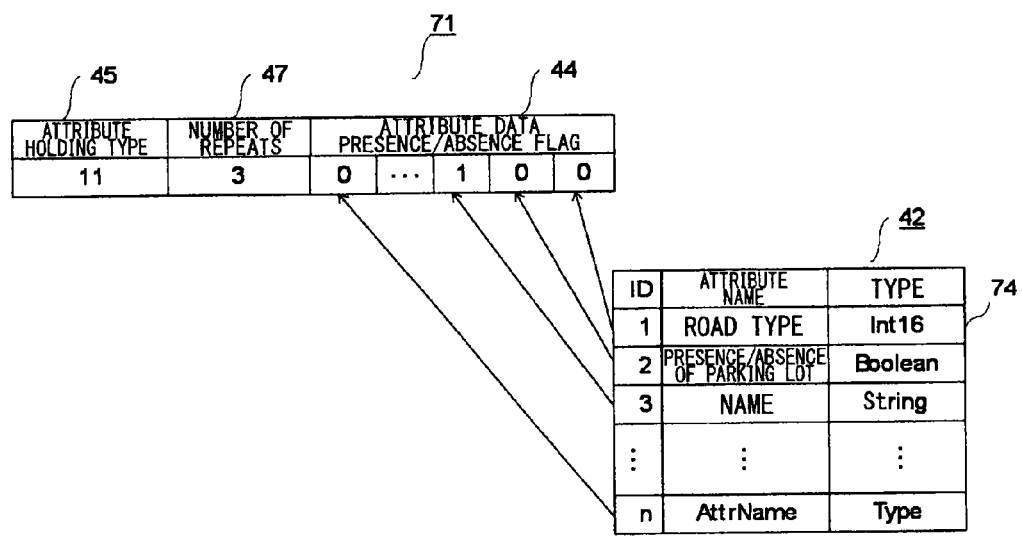
FIG. 10 is a view showing still another constitution of the relation information in accordance with the first preferred embodiment of the present invention.

FIG. 10 shows data constitution of the relation information 71 in the case where the bit value of the attribute holding type information 45 is "11". In this case, the number of repeats 47 indicating the number of references to the attribute information 72 to be repeated by the geometric information 70 is stored after the 2-bit value "11" of the attribute holding type information 45. In the present preferred embodiment, the number of repeats 47 is "3". The number of repeats 47 can be set in advance, for example, when the map data is generated, depending on the use of the map data to be used.

After the number of repeats 47, the arrangement of the Bool values in the attribute data presence/absence flag 44 is placed. As described above, the order of arrangement is the same as the arrangement of the pieces of attribute definition information 74 in the attribute definition information data list 42, which is defined in advance. With such repeated references to the attribute information 72, for example, the information terminal device may execute a program by which the attribute information data list 41 is referred to a plurality of times, a plurality of corresponding attribute values are acquired, and only the attribute information 72 suitable for the time when the attribute is acquired is displayed on the map.

In this case, for example, the attribute definition information 74 for different time zones are generated and the attribute information 72 is referred to on the basis of the attribute definition information 74 for all the time zones. After that, the attribute data for the time zone to be needed may be reflected.

Figure 11:
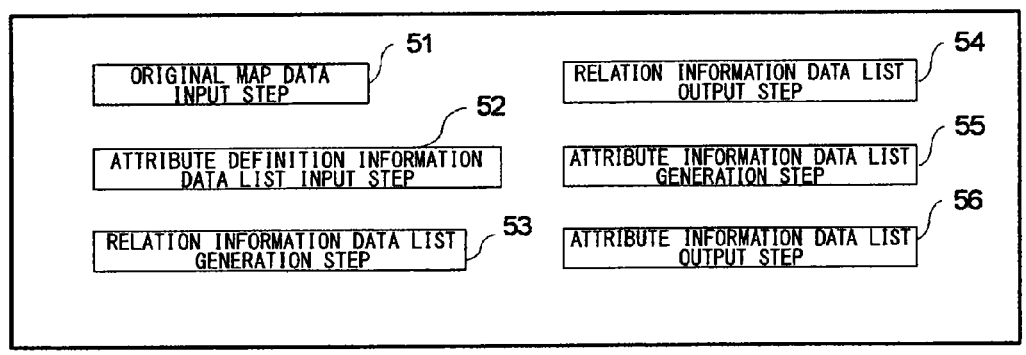
FIG. 11 is a view showing process steps to implement a method of generating map data in accordance with the first preferred embodiment of the present invention.

Next, the process steps in a method of generating map data to be executed by the map data generator will be described. FIG. 11 shows the process steps in the method of generating map data. Though it is assumed that the map data to be used by the information terminal device is generated in advance, for example, by a map data generator in a factory in the present preferred embodiment, the place where the map data is generated is not limited thereto.

In FIG. 11, an original map data input step 51 is a process step in which the original map data including the geometric information 70 and the attribute information 72 is inputted into the map data generator, the pieces of geometric information 70 are arranged, and the geometric information data list 21 is generated. The arrangement of the pieces of geometric information 70 in the geometric information data list 21, however, may be performed arbitrarily or may be adjusted as appropriate on the basis of the type of attribute of a feature, or the like. An attribute definition information data list input step 52 is a process step in which the attribute definition information data list 42 which is generated in advance by a producer of a product, or the like, is inputted to the map data generator.

A relation information data list generation step 53 is a process step in which the attribute information 72 corresponding to the geometric information 70 is extracted on the basis of the geometric information data list 21 which has been already generated in the original map data input step 51 and with reference to the extracted attribute information 72, generated is the relation information data list 43 associating the geometric information 70 with the attribute information 72. A relation information data list output step 54 is a process step in which the relation information data list which has been generated in the relation information data list generation step 53 is outputted to the storage device formed of, for example, a magnetic disk or the like.

An attribute information data list generation step 55 is a process step in which the attribute information 72 included in the original map data inputted in the original map data input step 51 is extracted, the pieces of attribute information 72 are arranged on the basis of the arrangement of the pieces of geometric information 70 in the geometric information data list 21 that the original map data has, and the attribute information data list 41 is thereby generated. An attribute information data list output step 56 is a process step in which the attribute information data list 41 which has been generated in the attribute information data list generation step 55 is outputted to the storage device formed of, for example, a magnetic disk or the like.

Further, though the case is shown where the process steps 51 to 56 in the method of generating map data are performed in the ascending order of the numerical signs given to the process steps, the order of performing these process steps is not limited thereto, but even when, for example, the relation information data list generation step 53 and the relation information data list output step 54 are performed after the attribute information data list generation step 55 and the attribute information data list output step 56, the characteristic feature of the present invention is maintained.

Figure 12:
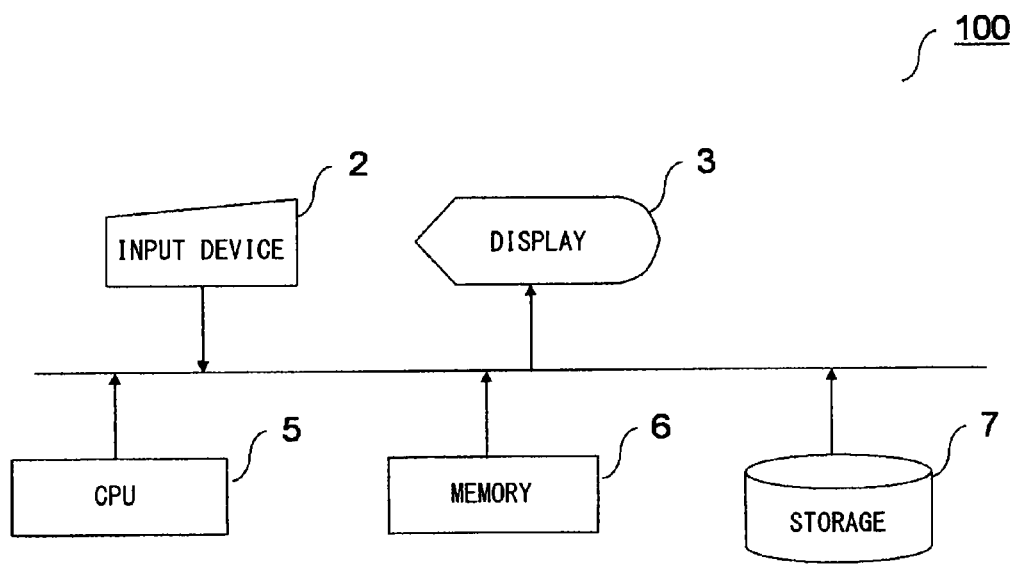
FIG. 12 is a view showing a constitution of a map data generator which generates the map data in accordance with the first preferred embodiment of the present invention.

FIG. 12 shows a constitution of a map data generator 100 performing the process steps in the method of generating map data, which are shown in FIG. 11. A map data generation program to be used to execute the process steps 51 to 56 in the method of generating map data is stored in a storage 7 formed of a magnetic disk or the like and expanded in a memory 6 when it is used.

Further, the original map data and the map data which is generated through the process steps and has the data structure in accordance with the present invention are also stored in the storage 7. In some cases, a plurality of storages 7 shown in FIG. 12 may be used, depending on data capacity.

In order to execute the map data generation program by using the map data generator, a user inputs an execution command into the map data generator 100 by using an input device 2 consisting of a keyboard and a mouse. The progress and result of execution of the map data generation program can be checked by using a display 3.

Figures 13, 14:
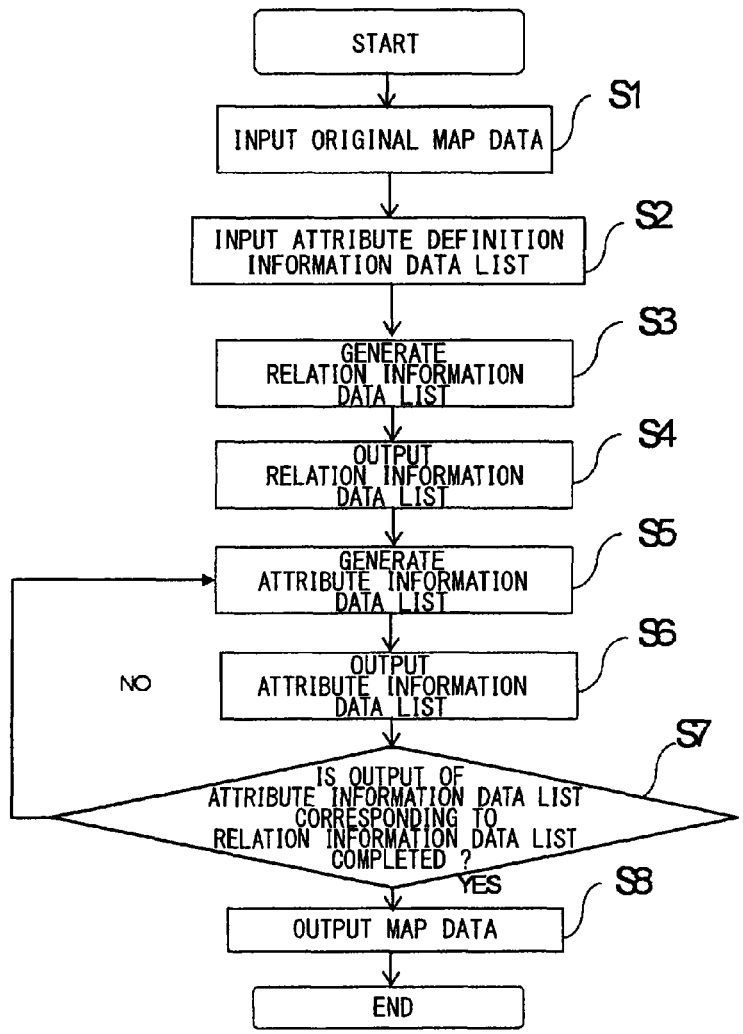
FIG. 13 is a view showing an operation flow for generating map data in accordance with the first preferred embodiment of the present invention.
FIG. 14 is a view showing attribute definition information for each application in accordance with the first preferred embodiment of the present invention.

FIG. 13 shows a procedure of generating map data, which is executed by the map data generator 100. In Step S1, in order to generate the map data of the present invention, the original map data including the geometric information 70 and the attribute information 72 stored in an external storage is read in, and the geometric information data list 21 in which the pieces of geometric information 70 are arranged is generated.

The arrangement of the pieces of geometric information 70 in the geometric information data list 21, however, may be performed arbitrarily or may be adjusted as appropriate on the basis of the type of attribute of a feature, or the like. In Step S2, the attribute definition information data list 42 generated in advance is inputted. In Step S3, the relation information data list 43 shown in FIGS. 7 to 10 is generated.

In Step S4 shown in FIG. 13, the relation information data list 43 generated in Step S3 is outputted to the storage 7 formed of a magnetic disk or the like. In Step S5, by using the relation information data list 43 generated in Step S3 and the original map data inputted in Step S1, the attribute information data list 41 shown in FIG. 6 is generated.

In Step S6, the attribute information data list 41 generated in Step S5 is outputted to an external storage formed of a magnetic disk or the like. In Step S7, it is determined whether or not the output of the attribute information data list 41 corresponding to the relation information data list 43 generated in Step S3 is completed, and when the output of the attribute information data list 41 in which the pieces of attribute information 72 corresponding to all the pieces of geometric information 70 are arranged is completed, generation of the map data is finished and when the output is not completed, the process goes back to Step S5 and the process of generating the attribute information data list 41 is performed.

Further, though the case is shown where the above-described process steps S1 to S8 in the procedure of generating map data are performed in the ascending order of the numerical signs of the process steps, the order of performing these process steps is not limited thereto. For example, the relation information data list generation step S3 and the relation information data list output step S4 may be performed after the attribute information data list generation step S5 and the attribute information data list output step S6.

The relation information data lists 43 are different, depending on applications which use the map data. FIG. 14 shows the difference between the pieces of attribute definition information 74 to be used in applications when the map data is generated. In a case where map display is performed, for example, the attribute definition information 74 to be used is the first one (ID: 1, Attribute Name: road type, Type: Int16) and the third one (ID: 3, Attribute Name: name, Type: String) in the attribute definition information data list 42. On the other hand, in a case where route search is performed, the attribute definition information 74 to be used is the fourth, fifth, and sixth ones (all not shown) in the attribute definition information data list 42.

FIG. 15 is a block diagram showing an exemplary hardware constitution of an information terminal device 1 in accordance with the present invention. In FIG. 15, it is assumed that the information terminal device 1 is a mobile information terminal such as a car navigation device (vehicle-mounted information terminal device), a smartphone, a cellular phone, a PDA (Personal Digital Assistant), or the like.

A storage 17 stores therein the map data generated in accordance with the present invention, a data access program used to access the map data, an application program used to perform a desired function by using the map data, data to be used in an application process, and the like.

The data access program is a program used to acquire data required to execute the application program from a set of data stored in the storage 17. The application program is a program used to implement various functions to be performed in the information terminal device 1, and in the car navigation device, for example, the application program is a program used to implement a route guidance function, a map display function, and a route search function. The data access program and the application program are expanded from the storage 17 into a memory 16 and executed in a CPU 15.

Further, as the storage 17, a recording medium can be used, such as a hard disk device (HDD) mounted in the information terminal device 1, an external storage medium such as a CD, a DVD, or the like which is reproducible in a drive device mounted in the information terminal device 1, a USB (Universal Serial Bus) memory which is data readable and writable through a predetermined input/output interface, or the like.

An operation result obtained by the CPU 15 is outputted to a display 13 through a bus 18 and displayed on a screen. The display 13 is a device on which a map or the like to be used for route guidance, for example, can be displayed, and is a liquid crystal display, a plasma display, or the like. A communication device 14 is a device performing communication with a not-shown external device.

In a case where the information terminal device 1 is a vehicle-mounted information terminal device (car navigation device), the communication device 14 serves as a position detector that receives at least one of a GPS signal from a GPS (Global Positioning System) satellite and an FM radio wave, to thereby detect position information.

The input device 12 is a device by which the user performs an operation input from the outside, and corresponds to a keyboard, an operation switch, a touch panel combined with the display 13, or the like. The user uses the input device 12 to input conditions and the like for the route search and the map display or to select an application.

FIG. 16 specifically shows such a constitution of the information terminal device 1 in accordance with the first preferred embodiment of the present invention as to perform the map display from the map data generated by using the method of generating map data in accordance with the present invention. FIG. 16 shows, in particular, a vehicle-mounted information terminal device as an example of the information terminal device 1.

The information terminal device 1 has an input device 12a having a display function, which unifies the input device 12 and the display 13 shown in FIG. 15. The input device 12a includes a keyboard, an operation switch, a display having a touch panel, or the like.

A position detector 61 has a function of receiving at least one of the GPS signal from the GPS satellite and the FM radio wave, to thereby detect position information. This corresponds to the communication device 14 shown in FIG. 15. The map database unit 8 is a constituent unit that stores therein the map data generated by the method in accordance with the present invention and is stored in the storage 17 in FIG. 15.

A navigation function execution unit 63 is a constituent unit that performs various functions required for navigation, such as the map display, on the basis of the map data acquired from the map database unit 8 through a data access unit 62 and a current position of the information terminal device 1, which is detected by the position detector 61. The navigation function execution unit 63 is constituted of the CPU 15, the memory 16, and the storage 17 in FIG. 15.

The data access unit 62 is a constituent unit positioned between the navigation function execution unit 63 and the map database unit 8 so that the navigation function execution unit 63 can appropriately acquire the map data. The data access unit 62 is also constituted of the CPU 15, the memory 16, and the storage 17 in FIG. 15.

In the information terminal device 1 in accordance with the first preferred embodiment, since the information terminal device 1 comprises the map database unit 8 that stores therein the map data having the feature information data list 10 in which the pieces of feature information 9 each representing a feature are arranged, the attribute information data list 41 in which the pieces of attribute information 72 each of the feature are arranged corresponding to the order of the feature information 9, and the relation information data list 43 in which the pieces of relation information 71 each associating the feature information 9 with the attribute information 72 are arranged corresponding to the order of the feature information 9, the navigation function execution unit 63 that executes a navigation function, and the data access unit 62 that acquires the map data to be used by the navigation function execution unit 63 from the map database unit 8, it is possible to increase the data extensibility in adding and deleting the attribute value of the attribute information 72.

Further, in the information terminal device 1 in accordance with the first preferred embodiment, since the feature information data list 10 has at least one of the geometric information data list 21 in which the pieces of geometric information 70 each representing a shape of the feature are arranged and the phase information data list in which the pieces of phase information 73 each representing connection of the features are arranged, in association between the geometric information 70 and the attribute information 72 or between the phase information 73 and the attribute information 72, it is possible to increase the data extensibility in adding and deleting the attribute value of the attribute information 72.

Furthermore, in the information terminal device 1 in accordance with the first preferred embodiment, since the relation information 71 further has the attribute holding type information 45 representing the holding type of the attribute information 72, it is possible to improve the efficiency of data access even when it is intended to acquire a plurality of attributes at one time.

In the information terminal device 1 in accordance with the first preferred embodiment, since the map data stored in the map database unit 8 further has the attribute definition information data list 42 in which the pieces of attribute definition information 74 each defining a type of an attribute of the attribute information 72 are arranged and the relation information 71 has the attribute data presence/absence flag 44 indicating whether or not there is the attribute definition information 74 to be referred to by the relation information 71, the attribute information 72 can be selected, depending on the difference in model of the information terminal device 1 (expensive one or cheap one) and it is possible to increase the customizability of the map data.

Further, in the information terminal device 1 in accordance with the first preferred embodiment, since the attribute data presence/absence flags 44 are arranged corresponding to the order of the attribute definition information 74 in the attribute definition information data list 42, it is possible to achieve higher efficiency in acquiring the attribute information 72 and also possible to reduce the data size of the map data without any specific ID information needed.

In the method of generating map data to be executed by the map data generator in accordance with the first preferred embodiment, since the method comprises the steps of generating the feature information data list 10 in which the pieces of feature information 9 each representing a feature are arranged, generating the attribute information data list 41 in which the pieces of attribute information 72 each of the feature are arranged corresponding to the order of the feature information 9, and generating the relation information data list 43 in which the pieces of relation information 71 each associating the feature information 9 with the attribute information 72 are arranged corresponding to the order of the feature information 9, it is possible to increase the data extensibility in adding and deleting the attribute value of the attribute information 72.

Further, in the method of generating map data in accordance with the first preferred embodiment, since the feature information data list 10 has at least one of the geometric information data list 21 in which the pieces of geometric information 70 each representing a shape of the feature are arranged and the phase information data list in which the pieces of phase information 73 each representing connection of the features are arranged, in association between the geometric information 70 and the attribute information 72 or between the phase information 73 and the attribute information 72, it is possible to increase the data extensibility in adding and deleting the attribute value of the attribute information 72.

Furthermore, in the method of generating map data in accordance with the first preferred embodiment, since the relation information 71 further has the attribute holding type information 45 representing the holding type of the attribute information 72, it is possible to improve the efficiency of data access even when it is intended to acquire a plurality of attributes at one time.

In the first preferred embodiment, since the method of generating map data to be executed by the map data generator further has the step of generating the attribute definition information data list 42 in which the pieces of attribute definition information 74 each defining a type of an attribute of the attribute information 72 are arranged and the relation information 71 has the attribute data presence/absence flag 44 indicating whether or not there is the attribute definition information 74 to be referred to by the relation information 71, the attribute information 72 can be selected, depending on the difference in model of the information terminal device 1 (expensive one or cheap one) and it is possible to increase the customizability of the map data.

Further, in the method of generating map data in accordance with the first preferred embodiment, since the attribute data presence/absence flags 44 are arranged corresponding to the order of the attribute definition information 74 in the attribute definition information data list 42, it is possible to achieve higher efficiency in acquiring the attribute information 72 and also possible to reduce the data size of the map data without any specific ID information needed.

In the map data recording medium in accordance with the first preferred embodiment, which is a recording medium recording therein data lists constituting the map data, since the map data recording medium records therein the feature information data list 10 in which the pieces of feature information 9 each representing a feature are arranged, the attribute information data list 41 in which the pieces of attribute information 72 each of the feature are arranged corresponding to the order of the feature information 9, and the relation information data list 43 in which the pieces of relation information 71 each associating the feature information 9 with the attribute information 72 are arranged corresponding to the order of the feature information 9, it is possible to increase the data extensibility in adding and deleting the attribute value of the attribute information 72.

Further, in the map data recording medium in accordance with the first preferred embodiment, since the feature information data list 10 has at least one of the geometric information data list 21 in which the pieces of geometric information 70 each representing a shape of the feature are arranged and the phase information data list in which the pieces of phase information 73 each representing connection of the features are arranged, in association between the geometric information 70 and the attribute information 72 or between the phase information 73 and the attribute information 72, it is possible to increase the data extensibility in adding and deleting the attribute value of the attribute information 72.

Furthermore, in the map data recording medium in accordance with the first preferred embodiment, since the relation information 71 further has the attribute holding type information 45 representing the holding type of the attribute information 72, it is possible to improve the efficiency of data access even when it is intended to acquire a plurality of attributes at one time.

In the first preferred embodiment, since the map data recording medium recording therein data lists constituting the map data further records therein the attribute definition information data list 42 in which the pieces of attribute definition information 74 each defining a type of an attribute of the attribute information 72 are arranged and the relation information 71 has the attribute data presence/absence flag 44 indicating whether or not there is the attribute definition information 74 to be referred to by the relation information 71, the attribute information 72 can be selected, depending on the difference in model of the information terminal device 1 (expensive one or cheap one) and it is possible to increase the customizability of the map data.

In the map data recording medium in accordance with the first preferred embodiment, since the attribute data presence/absence flags 44 are arranged corresponding to the order of the attribute definition information 74 in the attribute definition information data list 42, it is possible to achieve higher efficiency in acquiring the attribute information 72 and also possible to reduce the data size of the map data without any specific ID information needed.

The Second Preferred Embodiment

In the second preferred embodiment of the present invention, as shown in FIG. 17, a plurality of attribute information data lists 41 in each of which only the attribute information 72 to be used by an application is extracted are generated and the plurality of attribute information data lists 41 which are generated are managed as a function list for each application. As described in the first preferred embodiment, the attribute definition information 74 that is referred to depends on an application.

As shown in FIG. 17, when there are two applications having different functions, the first application is managed by a first attribute information data list 101 and the second application is managed by a second attribute information data list 102. In this case, the attribute definition information data list 42 corresponding to each attribute information data list 41 is further generated and the relation information data list 43 corresponding to the generated attribute definition information data list 42 is generated, and the data lists may be separately managed for each application.

The attribute definition information which is not used is thereby excluded from the attribute definition information data list, and since it is not necessary to vainly refer to the attribute information 72 which does not need to be associated, it is possible to quickly associate the relation information with the attribute definition information.

In the information terminal device 1 in accordance with the second preferred embodiment, since the map data stored in the map database unit 8 has a plurality of attribute information data lists 41 and a plurality of relation information data lists 43 corresponding to the attribute information data lists 41, the application can collectively acquire the pieces of attribute information 72 needed to implement the required function, and it can be expected to increase the processing speed of the application.

Further, in the information terminal device 1 in accordance with the second preferred embodiment, since the map data stored in the map database unit 8 has a plurality of attribute information data lists 41 and a plurality of relation information data lists 43 corresponding to the attribute information data lists 41, the application does not need to extract the attribute to be used after acquiring all the attribute information 72 included in the attribute information data list 41 or to acquire only the attribute to be used from the attribute information data list 41 in advance, which causes a processing load, and therefore it is possible to increase the efficiency of access to the attribute information 72.

In the method of generating map data in accordance with the second preferred embodiment, since the map data stored in the map database unit 8 has a plurality of attribute information data lists 41 and a plurality of relation information data lists 43 corresponding to the attribute information data lists 41, the application can collectively acquire the pieces of attribute information 72 needed to implement the required function, and it can be expected to increase the processing speed of the application.

Further, in the method of generating map data in accordance with the second preferred embodiment, since the map data stored in the map database unit 8 has a plurality of attribute information data lists 41 and further has relation information data lists 43 corresponding to the attribute information data lists 41, the application does not need to extract the attribute to be used after acquiring all the attribute information 72 included in the attribute information data list 41 or to acquire only the attribute to be used from the attribute information data list 41 in advance, which causes a processing load, and therefore it is possible to increase the efficiency of access to the attribute information 72.

In the second preferred embodiment, since the map data recording medium recording therein data lists constituting the map data records therein a plurality of attribute information data lists 41 and further records therein a plurality of relation information data lists 43 corresponding to the attribute information data lists 41, the application can collectively acquire the pieces of attribute information 72 needed to implement the required function, and it can be expected to increase the processing speed of the application.

Further, in the second preferred embodiment, since the map data recording medium recording therein data lists constituting the map data records therein a plurality of attribute information data lists 41 and further records therein a plurality of relation information data lists 43 corresponding to the attribute information data lists 41, the application does not need to extract the attribute to be used after acquiring all the attribute information 72 included in the attribute information data list 41 or to acquire only the attribute to be used from the attribute information data list 41 in advance, which causes a processing load, and therefore it is possible to increase the efficiency of access to the attribute information 72.

The Third Preferred Embodiment

Figures 18, 19:
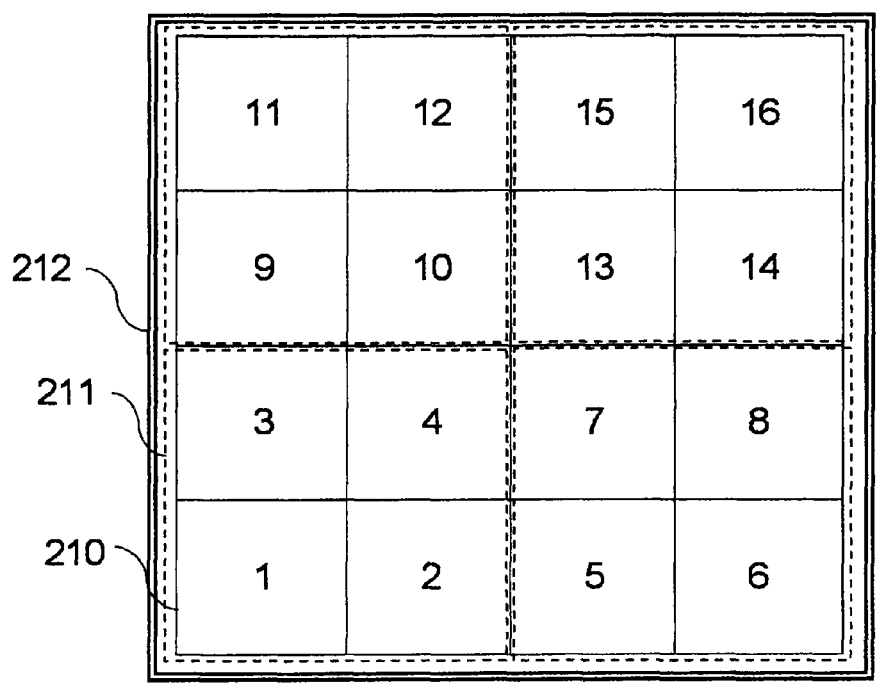
FIG. 18 is a view showing a constitution of address information in accordance with a third preferred embodiment of the present invention.
FIG. 19 is a view showing a constitution to manage the map data in accordance with a fourth preferred embodiment of the present invention.

As shown in FIG. 18, the third preferred embodiment of the present invention adopts a method of storing the attribute information 72 that the attribute data presence/absence flag in the relation information should refer to, with an address. As the address of the attribute information 72 that the relation information should refer to, an offset, an index, or the like of the attribute definition information 74 which corresponds to desired attribute information in the attribute definition information data list 42 is prepared in advance and stored as address information 110, and the address information 110 is referred to when the association is performed.

When the relation information 71 is associated with the attribute information 72, though the attribute information 72 is referred to on the basis of the Bool values arranged in the attribute data presence/absence flag 44, all the Bool values arranged in the attribute data presence/absence flag 44 are referred to in the first and second preferred embodiments.

In the third preferred embodiment, since only the Bool value which corresponds to the attribute information 72 to be referred to in the attribute definition information data list 42 is referred to, it is possible to quickly perform the association. Further, since all the attribute information 72 included in the original map data are held without omitting any, it is not necessary to further generate the attribute definition information data list 42 consisting of only the attribute information 72 to be used, unlike in the second preferred embodiment.

In the third preferred embodiment, such address information 110 is, for example, generated by the map data generator and stored in the storage 17 shown in FIG. 15.

In the information terminal device 1 in accordance with the third preferred embodiment, since the map data stored in the map database unit 8 further has the attribute definition information data list 42 in which the pieces of attribute definition information 74 each defining a type of an attribute of the attribute information 72 are arranged and the relation information 71 refers to the attribute definition information 74 to be referred to by the relation information 71, with address information 110 in the attribute definition information data list 42 in which the attribute definition information 74 are stored, when the application acquires the attribute information 72 of a desired feature, the application refers to the address information 110 to thereby eliminate the necessity of sequentially scanning and expanding the data stored in the attribute information 72 and make it possible to perform direct access to the attribute information 72 of the feature, and it can be therefore expected to increase the accessibility to the desired map data.

In the third preferred embodiment, since the method of generating map data to be executed by the map data generator further has the attribute definition information data list 42 in which the pieces of attribute definition information 74 each defining a type of an attribute of the attribute information 72 are arranged and the relation information 71 refers to the attribute definition information 74 to be referred to by the relation information 71, with address information 110 in the attribute definition information data list 42 in which the attribute definition information 74 are stored, when the application acquires the attribute information 72 of a desired feature, the application refers to the address information 110 to thereby eliminate the necessity of sequentially scanning and expanding the data stored in the attribute information 72 and make it possible to perform direct access to the attribute information 72 of the feature, and it can be therefore expected to increase the accessibility to the desired map data.

In the third preferred embodiment, the map data recording medium recording therein data lists constituting the map data further records therein the attribute definition information data list 42 in which the pieces of attribute definition information 74 each defining a type of an attribute of the attribute information 72 are arranged and the relation information 71 refers to the attribute definition information 74 to be referred to by relation information 71, with address information 110 in the attribute definition information data list 42 in which the attribute definition information 74 are stored, when the application acquires the attribute information 72 of a desired feature, the application refers to the address information 110 to thereby eliminate the necessity of sequentially scanning and expanding the data stored in the attribute information 72 and make it possible to perform direct access to the attribute information 72 of the feature, and it can be therefore expected to increase the accessibility to the desired map data.

The Fourth Preferred Embodiment

In the fourth preferred embodiment of the present invention, an area of a map which is reflected in map display by the map data is divided into rectangular areas as shown in FIG. 19 and thereby managed. The solid line in FIG. 19 represents a mesh 210 of level 1, the dotted line represents a mesh 211 of level 2, and the double line represents a mesh 212 of level 3.

As shown in FIG. 19, the mesh 211 of level 2 consists of combined four meshes 210 of level 1, and the mesh 212 of level 3 consists of combined four meshes 211 of level 2. In other words, the mesh 212 of level 3 consists of combined sixteen meshes 210 of level 1.

Figure 20:
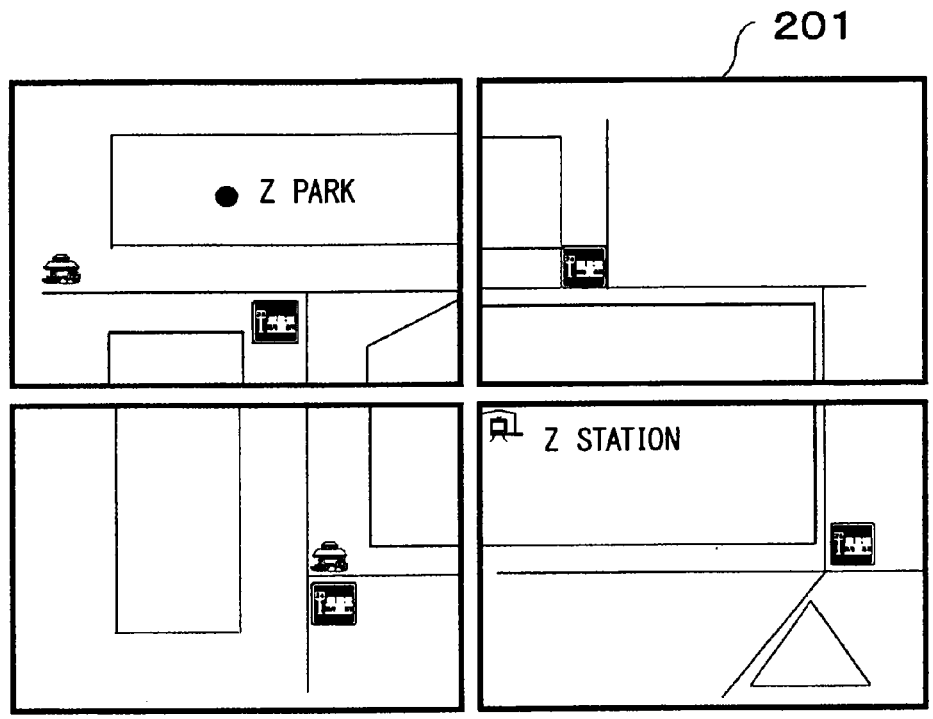
FIG. 20 is a view showing division of a map in accordance with the fourth preferred embodiment of the present invention.

FIG. 20 shows a map 201 managed by using the meshes 210 of level 1. A map generated by using the map data is managed, being divided, like the map 201. Further, this mesh structure is not changed even when the level becomes higher.

Figure 21:
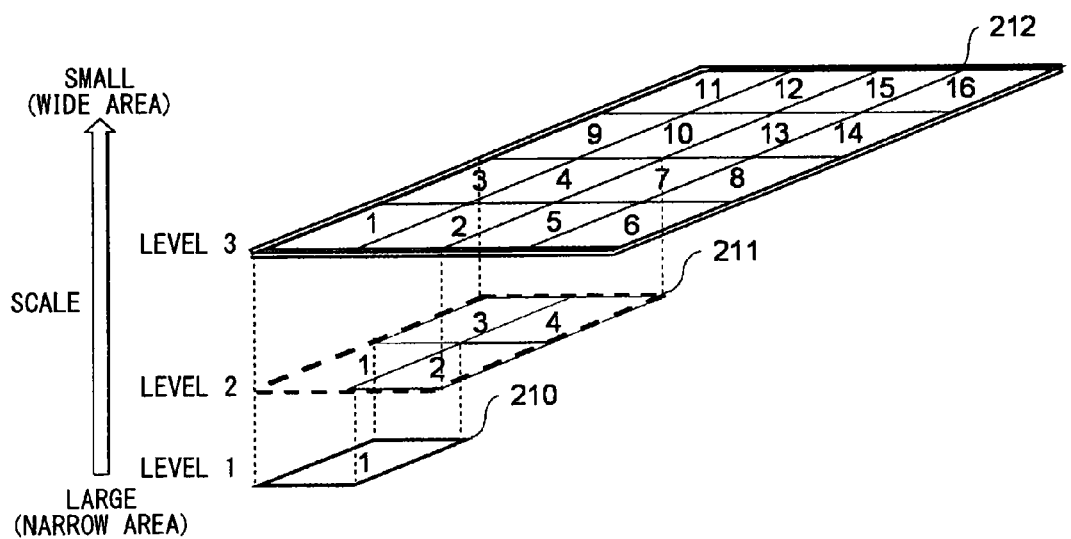
FIG. 21 is a view showing hierarchization of the map data in accordance with the fourth preferred embodiment of the present invention.

FIG. 21 shows hierarchical management of the map data in accordance with the data level of detail of the map data. FIG. 21 illustrates the map data of three hierarchical levels. The mesh 210 represented by the solid line is used when the map is enlarged (in a large scale) for display, the mesh 211 represented by the dotted line is used when the map is displayed in a scale smaller than that of the mesh 210, and the mesh 212 represented by the double line is used when the map is displayed in a scale smaller than that of the mesh 211.

The number of pieces of geometric information 70 to be displayed varies in accordance with the enlargement and contraction of the map. When the map is displayed in a small scale, for example, it is not necessary to associate all the geometric information 70 in the range to be displayed with the corresponding attribute information 72. Conversely, when the map is displayed in a large scale, it is necessary to associate many pieces of geometric information 70 with the attribute information 72. Thus, within the mesh to be displayed, since the number of pieces of geometric information 70 needed for display varies with the scale, the relation information data list 43 is generated for each mesh.

Figure 22:
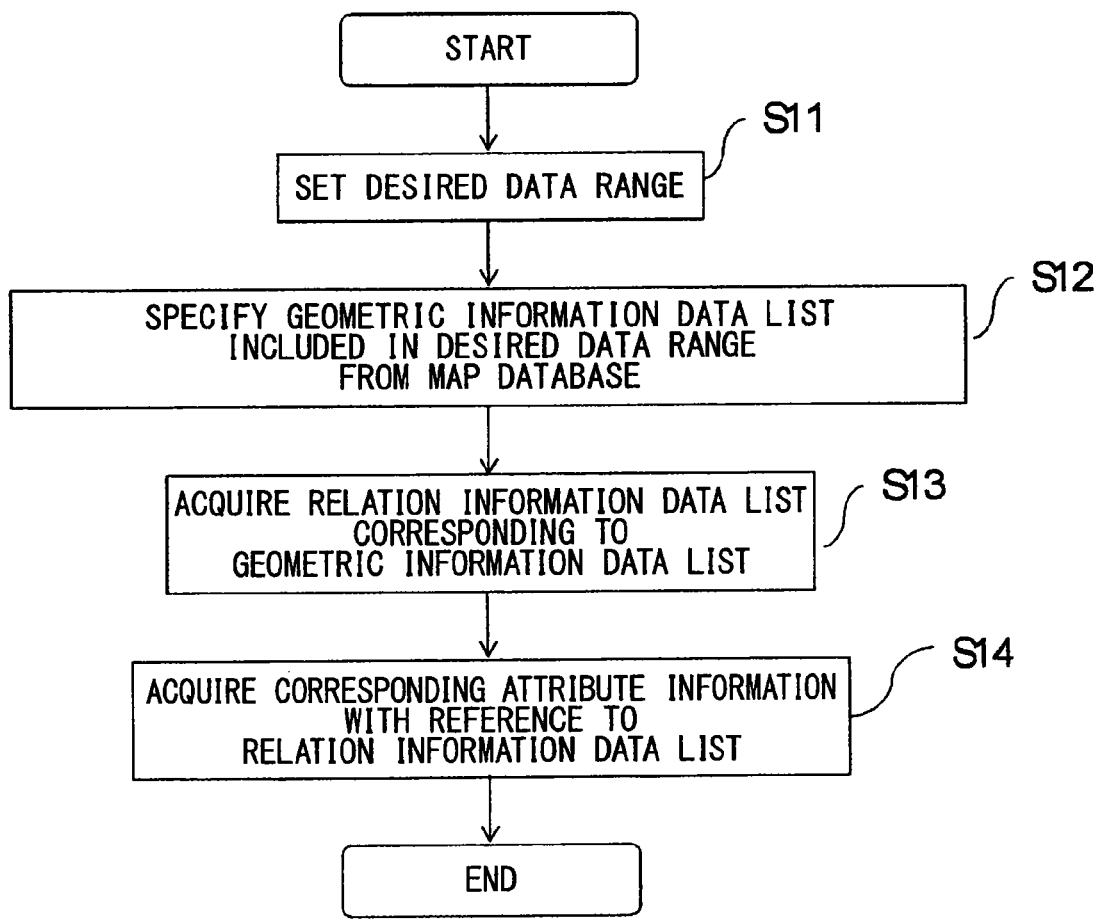
FIG. 22 is a flowchart showing use of the map data in accordance with the fourth preferred embodiment of the present invention.

FIG. 22 shows an operation flow of the information terminal device 1 for acquiring the map data within a desired range, from the map database unit 8 described with reference to FIG. 16, by using the data access program in the data access unit 62.

Referring to FIG. 22, in Step S11, a data range needed for map display is set (setting of desired data range). This data range is determined on the basis of the information of the position detector 61 shown in FIG. 16 or the data to be inputted into the input device 12. The determined data range is set in the data access unit 62.

In Step S12, the geometric information data list 21 corresponding to the desired data range is specified from the map data stored in the map database unit 8 of the information terminal device 1 shown in FIG. 16. The desired data range is set in advance in Step S11.

In Step S13, the relation information data list 43 corresponding to the geometric information data list 21 included in the range specified in Step S12 is acquired from the map database unit 8. In Step S14, the attribute information data list 41 corresponding to the relation information data list 43 acquired in Step S13 is acquired from the map database unit 8. Through these steps, acquisition of the map data to be used in the information terminal device 1 is completed.

In the information terminal device 1 in accordance with the fourth preferred embodiment, since the data access unit 62 acquires the map data to be used by the navigation function execution unit 63, for each divided map area, the map data can be managed in small spatial units, and it can be therefore expected to increase the accessibility to the desired map data.

The present invention is not limited to the above-described preferred embodiments, and the preferred embodiments may be freely combined, changed as appropriate, or omitted without departing from the scope of the invention. Further, a device to which the map data in accordance with the present invention can be applied is not limited to ones described in the above preferred embodiments.

DESCRIPTION OF REFERENCE NUMERALS 1 information terminal device
8 map database unit 9 feature information
10 feature information data list
21 geometric information data list
41 attribute information data list
42 attribute definition information data list
43 relation information data list
45 attribute holding type information
44 attribute data presence/absence flag
62 data access unit
63 navigation function execution unit
70 geometric information
71 relation information
72 attribute information
73 phase information
74 attribute definition information
110 address information

The invention claimed is:

1. A navigation device comprising:
a map database memory to store therein map data having a feature information data list in which pieces of feature information each representing a feature are arranged, an attribute information data list in which pieces of attribute information each of said feature are arranged, and a relation information data list in which pieces of relation information each including attribute holding type information indicating whether or not there is said attribute information corresponding to said feature information are arranged corresponding to the order of said feature information;
a processor to
execute a navigation function, and
acquire map data to be used in executing said navigation function from said map database memory and associate said feature information with corresponding attribute information in the order of arrangement of said relation information when said map data to be used in executing said navigation function is acquired from said map database memory,
wherein an arrangement of said attribute information data list is made corresponding to the order of said feature information and when said attribute information corresponding to said feature information arranged in said feature information data list does not exist, said arrangement of said attribute information data list is made with said attribute information omitted, and
said relation information associates said feature information with said attribute information when said attribute holding type information indicates that there is said attribute information corresponding to said feature information.

2. The navigation device according to claim 1, wherein said feature information data list has at least one of a geometric information data list in which pieces of geometric information each representing a shape of said feature are arranged and a phase information data list in which pieces of phase information each representing connection of said features are arranged.

3. The navigation device according to claim 1, wherein said map data stored in said map database memory has a plurality of said attribute information data lists and a plurality of said relation information data lists corresponding to said attribute information data lists.

4. The navigation device according to claim 1, wherein said map data stored in said map database memory further has an attribute definition information data list in which pieces of attribute definition information each defining a type of an attribute of said attribute information are arranged, and
said relation information has an attribute data presence/absence flag indicating whether or not there is said attribute definition information to be referred to by said relation information.

5. The navigation device according to claim 4, wherein said attribute data presence/absence flags are arranged corresponding to the order of said attribute definition information in said attribute definition information data list.

6. The navigation device according to claim 4, wherein when said attribute holding type information indicates that there is said attribute information corresponding to said feature information, said attribute holding type information further includes:
information indicating that there is one said attribute information corresponding to said feature information;
information indicating that said attribute information corresponding to said feature information has a plurality of groups; and
information indicating that there are different values in said attribute data presence/absence flag included in one said attribute information corresponding to said feature information.

7. The navigation device according to claim 1, wherein said map data stored in said map database memory further has an attribute definition information data list in which pieces of attribute definition information each defining a type of an attribute of said attribute information are arranged, and
said relation information refers to said attribute definition information to be referred to by said relation information, with address information in said attribute definition information data list in which said attribute definition information are stored.

8. The navigation device according to claim 1, wherein said processor acquires said map data to be used in executing said navigation function, for each divided map area.

9. The navigation device according to claim 1, wherein said navigation device is a vehicle-mounted navigation device.

10. A navigation device comprising:
a map database memory to store therein map data having a feature information data list in which pieces of feature information each representing a feature are arranged, an attribute information data list in which pieces of attribute information each of said feature are arranged, and a relation information data list in which pieces of relation information each including attribute holding type information indicating whether or not there is said attribute information corresponding to said feature information are arranged corresponding to the order of said feature information;
a processor to execute a program; and
a memory to store the program which causes the processor to:
execute a navigation function;
acquire map data to be used in executing said navigation function from said map database memory; and
associate said feature information with corresponding attribute information in the order of arrangement of said relation information when said map data to be used in executing said navigation function is acquired from said map database memory,
wherein an arrangement of said attribute information data list is made corresponding to the order of said feature information and when said attribute information corresponding to said feature information arranged in said feature information data list does not exist, said arrangement of said attribute information data list is made with said attribute information omitted, and said relation information associates said feature information with said attribute information when said attribute holding type information indicates that there is said attribute information corresponding to said feature information.

11. A navigation method comprising:

storing, in a map database memory, map data having a feature information data list in which pieces of feature information each representing a feature are arranged, an attribute information data list in which pieces of attribute information each of said feature are arranged, and a relation information data list in which pieces of relation information each including attribute holding type information indicating whether or not there is said attribute information corresponding to said feature information are arranged corresponding to the order of said feature information;

executing, with a processor, a navigation function; and acquiring, with the processor, map data to be used in executing said navigation function from said map database memory and associate said feature information with corresponding attribute information in the order of arrangement of said relation information when said map data to be used in executing said navigation function is acquired from said map database memory, wherein an arrangement of said attribute information data list is made corresponding to the order of said feature information and when said attribute information corresponding to said feature information arranged in said feature information data list does not exist, said arrangement of said attribute information data list is made with said attribute information omitted, and said relation information associates said feature information with said attribute information when said attribute holding type information indicates that there is said attribute information corresponding to said feature information.

* * * * *